Dec. 22, 1925.  
W. M. SHEEHAN  
1,566,510  
LOCOMOTIVE FRAME FRONT END  
Filed Nov. 24, 1924
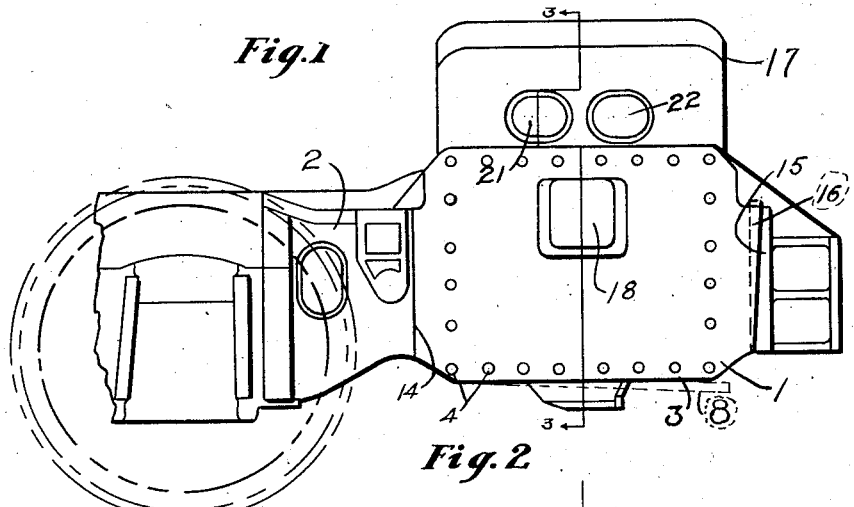
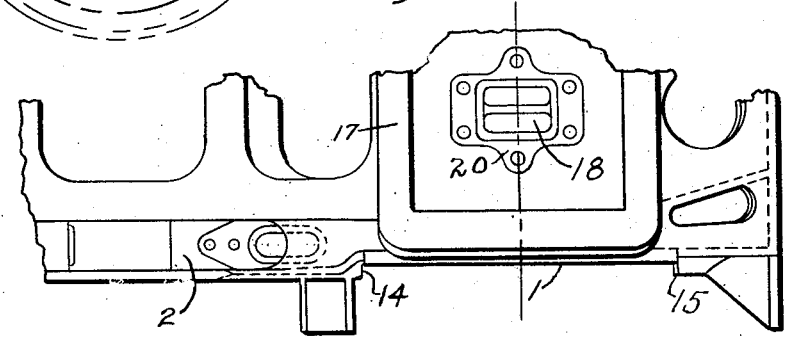
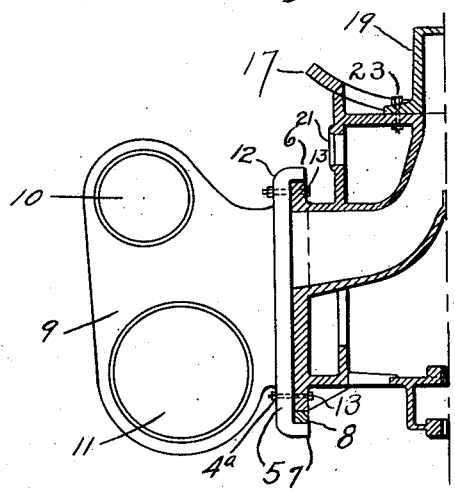
Inventor  
William M Sheehan  
By Cornwall, Bedell + Janus  
ATTYS Patented Dec. 22, 1925.

1,566,510

UNITED STATES PATENT OFFICE.

WILLIAM M. SHEEHAN, OF ST. LOUIS, MISSOURI, ASSIGNOR TO COMMONWEALTH STEEL COMPANY, OF ST. LOUIS, MISSOURI, A CORPORATION OF NEW JERSEY.

LOCOMOTIVE FRAME FRONT END.

Application filed November 24, 1924. Serial No. 751,892.

*To all whom it may concern:*

Be it known that I, WILLIAM M. SHEE-HAN, a citizen of the United States, residing at St. Louis, Missouri, have invented a certain new and useful Improvement in Locomotive Frame Front Ends, of which the following is a specification, such as will enable others skilled in the art to which it appertains to make and use the same.

My invention relates to locomotives and more particularly to the forward end of the frame which is carried by wheels and which in turn supports the smoke box portion of the boiler.

One object of my invention is to provide means for rigidly attaching the cylinders to the cylinder bearing surface.

Another object is to arrange the parts in such a way as to permit the use of through bolts and nuts instead of the customary studs for attaching the exhaust steam nozzle to the smoke box saddle and for connecting the cylinders to the cylinder bearing surfaces.

With these and other objects in view, my invention consists in certain novel features of construction and arrangement of parts, hereinafter more fully described and claimed, and illustrated in the accompanying drawings, in which—

Figure 1 is a side elevation of my locomotive frame front end.

Figure 2 is a top plan view of one-half of the locomotive frame front end.

Figure 3 is a cross section taken on line 3—3 of Figure 1.

The numeral 1 in the drawing indicates the cylinder bearing portion of a locomotive frame front end and may be formed integrally with or attached to the side frame member 2. The lower edge 3 of cylinder bearing surface 1 is tapered slightly downwardly from front to rear for purposes hereinafter described. Bolt holes 4 are provided around the outer edge of the cylinder bearing surface 1 to coincide with corresponding bolt holes 4ª in the cylinder frame 5.

The cylinder frame 5 is provided with projecting lips 6 and 7 at its upper and lower edges. These lips extend over and under the upper and lower edges of the cylinder bearing surface 1 in such a way that when the cylinder is placed in position against the cylinder bearing surface the upper lip 6 rests against the top edge thereof while the lower lip 7 is spaced from the lower or tapered edge 3 of the cylinder bearing surface.

A wedge 8 is provided between the tapered edge 3 and lip 7 to lock these parts against relative vertical movement.

The shape of the cylinder frame 5 is such that the cylinder housing portion 9 of the frame conforms with the shape of the cylinders 10 and 11. This leaves a space between the cylinder base plate 12 and the housing portion 9 so that through nuts and bolts 13 may be used in preference to studs for attaching the cylinder frame 5 to the cylinder bearing surface 1. At the rearward end of cylinder bearing surface 1 a vertically disposed positioning rib 14 is provided. This rib is preferably formed as a part of the cylinder bearing surface and projects outwardly therefrom. A second rib 15 is provided at the forward end of the cylinder bearing surface. The rearward face of rib 15 is slightly inclined to the vertical. A wedge 16 is utilized for locking the cylinders against relative horizontal movement.

A smoke box saddle 17 is provided with integrally formed exhaust steam passageways 18 leading to the exhaust nozzle 19. Nozzle 19 projects above the top of saddle 17 and into the smoke box of the locomotive, not shown.

It is customary in locomotive construction to attach the exhaust steam nozzle 19 to the nozzle bearing surface 20 by stud bolts. This type of assembly is unsatisfactory because of the constant attention necessary to keep these studs firmly in place. In my improved locomotive frame front end, I provide openings 21 and 22 in the side of the saddle to provide access to and permit the insertion of a wrench to the inner portion thereof. This type of construction allows the use of through bolts and nuts 23 for the purpose of attaching nozzle 19. The nozzle bearing surface 20 is slightly lower than the curved smoke box supporting portion of the saddle 17 so that the tools used in finishing the smoke box bearing surface do not interfere with the nozzle bearing surface.

In assembling my improved locomotive frame front end, the cylinder frame 5 is placed against cylinder bearing surface 1 with the lip 6 resting on the top edge of the cylinder bearing surface and the rearward edge of cylinder frame base plate 12 against the rib 14. Wedge 16 is driven into place between the front edge of cylinder frame base plate 12 and the inclined rib 15. Wedge 8 is in turn driven between the lower tapered edge 3 of the cylinder bearing surface and the projecting lip 7 of the cylinder frame. Bolts and nuts 13 are then inserted through the coinciding openings 4 and 4ª in the cylinder bearing surface and the cylinder frame, respectively.

This structure and method of assembly provides the maximum of rigidity between attached parts and eliminates a large portion of the strain on the attaching nuts and bolts. A minimum number of parts are used. Due to the utilization of the inclined rib and inclined edge of the cylinder bearing surface, single wedges are used instead of pairs. This use of single wedges also eliminates the chance of losing one of a pair by having it drop out during some unusual strain on that portion of the locomotive. The result of this structure is that less attention is necessary to the maintenance of my improved locomotive frame front end and there is a corresponding decrease in upkeep cost.

The illustrated form is preferable but the inclined surfaces can be placed on the cylinder frame base plate instead of the cylinder bearing surface without departing from the spirit of my invention.

I claim:

1. In a locomotive, a cylinder bearing surface having a vertical rib at one end and an inclined rib at the opposite end, a cylinder frame adjacent to said cylinder bearing surface and between said ribs, and a wedge between said inclined rib and the end of said cylinder frame.

2. In a locomotive, a cylinder bearing surface having a vertical rib at one end of said surface and an inclined rib at the opposite end, a cylinder frame adjacent to said cylinder bearing surface and between said ribs, a wedge between said inclined rib and said cylinder frame, an overlapping lip on said cylinder frame resting on the top edge of said cylinder bearing surface, and an underlapping lip on the lower edge of said cylinder frame spaced from and projecting under the lower edge of said cylinder bearing surface.

3. In a locomotive, a cylinder bearing surface having a vertical rib at one end of said surface and an inclined rib at the opposite end, a cylinder frame adjacent to said cylinder bearing surface and between said ribs, a wedge between said inclined rib and said cylinder frame, an overlapping lip on said cylinder frame resting on the top edge of said cylinder bearing surface, an underlapping lip on the lower edge of said cylinder frame spaced from and projecting under the lower edge of said cylinder bearing surface, and a wedge between said underlapping lip and said cylinder bearing surface.

4. In a locomotive, a cylinder bearing surface and a cylinder frame base plate adjacent thereto, a projecting lip on said base plate overlapping the upper edge of said cylinder bearing surface, a second projecting lip on said base plate underlapping and spaced from the lower edge of said cylinder bearing surface, and a wedge between said underlapping lip and the lower edge of said cylinder bearing surface.

5. In a locomotive, a cylinder bearing surface and a cylinder frame base plate adjacent thereto, a projecting lip on said base plate overlapping the upper edge of said cylinder bearing surface, and a second projecting lip on said base plate underlapping said cylinder bearing surface.

6. In a locomotive, a cylinder bearing surface having one of its edges inclined, a cylinder frame base plate adjacent to said surface, a lip on said base plate projecting past and spaced from said inclined edge, a second lip on said base plate resting against the edge of said surface opposite said inclined edge, and a wedge between said inclined edge and said first mentioned lip.

7. In a locomotive frame front end, a cylinder bearing surface having a vertical rib at one end and an inclined rib at the opposite end, all formed integrally with the frame, a cylinder frame adjacent to said cylinder bearing surface and between said ribs, and a wedge between said inclined rib and the edge of said cylinder frame.

8. In a locomotive frame front end, a cylinder bearing surface having a vertical rib at one end of said surface and an inclined rib at the opposite end, all formed integrally with the frame, a cylinder frame adjacent to said cylinder bearing surface and between said ribs, a wedge between said inclined rib and said cylinder frame, and an overlapping lip on said cylinder frame resting on the top edge of said cylinder bearing surface.

9. In a locomotive frame front end, a cylinder bearing surface having a vertical rib at one end of said surface and an inclined rib at the opposite end, all formed integrally with the frame, a cylinder frame adjacent to said cylinder bearing surface and between said ribs, a wedge between said inclined rib and said cylinder frame, an overlapping lip on said cylinder frame resting on the top edge of said cylinder bearing surface, an underlapping lip on the lower edge of said cylinder frame spaced from and projecting under the lower edge of said cylinder bearing surface, and a wedge between said underlapping lip and said cylinder bearing surface.

10. In a locomotive frame front end, the combination of a cylinder bearing surface having an exhaust steam passageway therethrough, a cylinder frame, means for attaching said cylinder frame to said cylinder bearing surface, a smoke box saddle, and an exhaust steam nozzle bearing surface being the terminus of said exhaust steam passageway, said nozzle bearing surface being on a lower plane than any portion of said saddle seat.

11. In a locomotive frame front end, the combination of a smoke box saddle, an exhaust steam nozzle bearing surface, an exhaust steam nozzle, bolts fastening said nozzle to said nozzle bearing surface, nuts, and means in said frame to permit the application of said nuts to said bolts interiorly of said frame.

12. In a locomotive frame front end, the combination of a smoke box saddle, an exhaust steam nozzle bearing surface, an exhaust steam nozzle, bolts fastening said nozzle to said nozzle bearing surface, nuts, and means in said frame to permit the application of said nuts to said bolts.

13. In a locomotive frame front end, the combination of a smoke box saddle seat, an exhaust steam nozzle bearing surface, said nozzle bearing surface being on a lower plane than any portion of said saddle seat, an exhaust steam nozzle, bolts fastening said nozzle to said nozzle bearing surface, and nuts locking said bolts in place.

14. In a locomotive frame front end, the combination of a smoke box saddle, and an exhaust steam nozzle bearing surface, said nozzle bearing surface being on a lower plane than any portion of said saddle seat.

In testimony whereof I hereunto affix my signature this 20 day of November, 1924.

WILLIAM M. SHEEHAN.